United States Patent
Malzbender et al.

(10) Patent No.: US 6,278,459 B1
(45) Date of Patent: Aug. 21, 2001

(54) OPACITY-WEIGHTED COLOR INTERPOLATION FOR VOLUME SAMPLING

(75) Inventors: Thomas Malzbender, Palo Alto; Michael E. Goss, Mountain View, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/915,031

(22) Filed: Aug. 20, 1997

(51) Int. Cl.$^7$ .................................................. G06T 17/00
(52) U.S. Cl. ............................................ 345/424; 345/431
(58) Field of Search .................................. 345/424, 426, 345/431

(56) References Cited

U.S. PATENT DOCUMENTS

| | | | |
|---|---|---|---|
| 5,339,386 | * 8/1994 | Sodenberg et al. | 395/122 |
| 5,457,482 | * 10/1995 | Rhoden et al. | 345/201 |
| 5,745,665 | * 4/1998 | Pasco | 395/127 |
| 5,847,711 | * 12/1998 | Kaufman et al. | 345/424 |

OTHER PUBLICATIONS

"Interactive Computer Graphics: A top–down Approach with OpenGL" —Edward Angel, Section 10.8.2, 1997.*
Hanspeter Pfister and Arie Kaufman, "Cube 4—A Scalable Architecture for Real–Time Volume Rendering", Symposium on Volume Visualization, pp. 47–54, ACM, Oct. 1996.

Marc Levoy, "Display of Surfaces from Volume Data", IEEE Computer Graphics and Applications, pp. 29–37, May 1988.

Marc Levoy, "Efficient Ray Tracing of Volume Data", ACM Transactions on Graphics, vol. 9, No. 3, pp. 245–261, Jul. 1990.

(List continued on next page.)

*Primary Examiner*—Mark Zimmerman
*Assistant Examiner*—Manlo Padmanabhan

(57) ABSTRACT

In order to solve the need for an accurate two-dimensional representation of a three-dimensional image, the invention provides an improved method and apparatus for processing voxel data which avoid the problem of color artifacts coming from zero opacity regions. The three-dimensional image is stored in a computer memory as a three-dimensional data array having object data values associated with sample points in a three-dimensional space. A central processing unit (CPU) processes the object data values to determine voxel colors C and voxel opacities $\alpha$ for the plurality of sample points and then opacity weights the voxel colors to produce a set of opacity weighted colors $\tilde{c}$. Next, the voxel opacities $\alpha$ and the opacity weighted colors $\tilde{c}$ from each sample point are composited in a compositor to form the two-dimensional representation. Finally, a display unit visually displays the two-dimensional representation. In this manner, artifacts resulting from zero opacity areas contributing to the overall color are eliminated because of the opacity weighting performed prior to compositing.

13 Claims, 6 Drawing Sheets

OTHER PUBLICATIONS

Philippe Lacroute and Marc Levoy, "Fast Volume Rendering Using a Shear–Warp Factorization of the Viewing Transformation", SIGGRAPH '94, Computer Graphics Proceedings, ACM SIGGraph, pp. 451–458, Jul. 1994.

Graphics and Visualization Lab, Army High Performance Computing Research Center, Minneasota Supercomputer Center, "All About Bob", http://www.arc.umn.edu/GVL/Software/bob.html.

Todd Kulick, "Building and OpenGL volume Renderer", http://reality.sgi.com/kulick_engr/devnews/volren/article.htm.

William H. Press, Saul A. Teukolsky, William T. Vetterling, Brian P. Flannery, "Numerical Recipes in C: The Art of Scientific Computing", 2nd Edition, Cambridge University Press, 1992.

Thomas Porter and Tom Duff, "Compositing Digital Images", Computer Graphics, pp. 253–259, Jul. 1984.

James F. Blinn, "Jim Blinn's Corner", IEEE Computer Graphics and Applications, "Compositing, Part 1: Theory", pp. 83–87, Sep., 1994; "Compositing, Part 2: Practice", pp. 78–82, Nov., 1994.

Robert A. Drebin, Loren Carpenter and Pat Hanrahan, "Volume Rendering", Computer Graphics, vol. 22, No. 4, pp. 65–74, Aug. 1998 (SIGGRAPH Conference Proceedings).

* cited by examiner

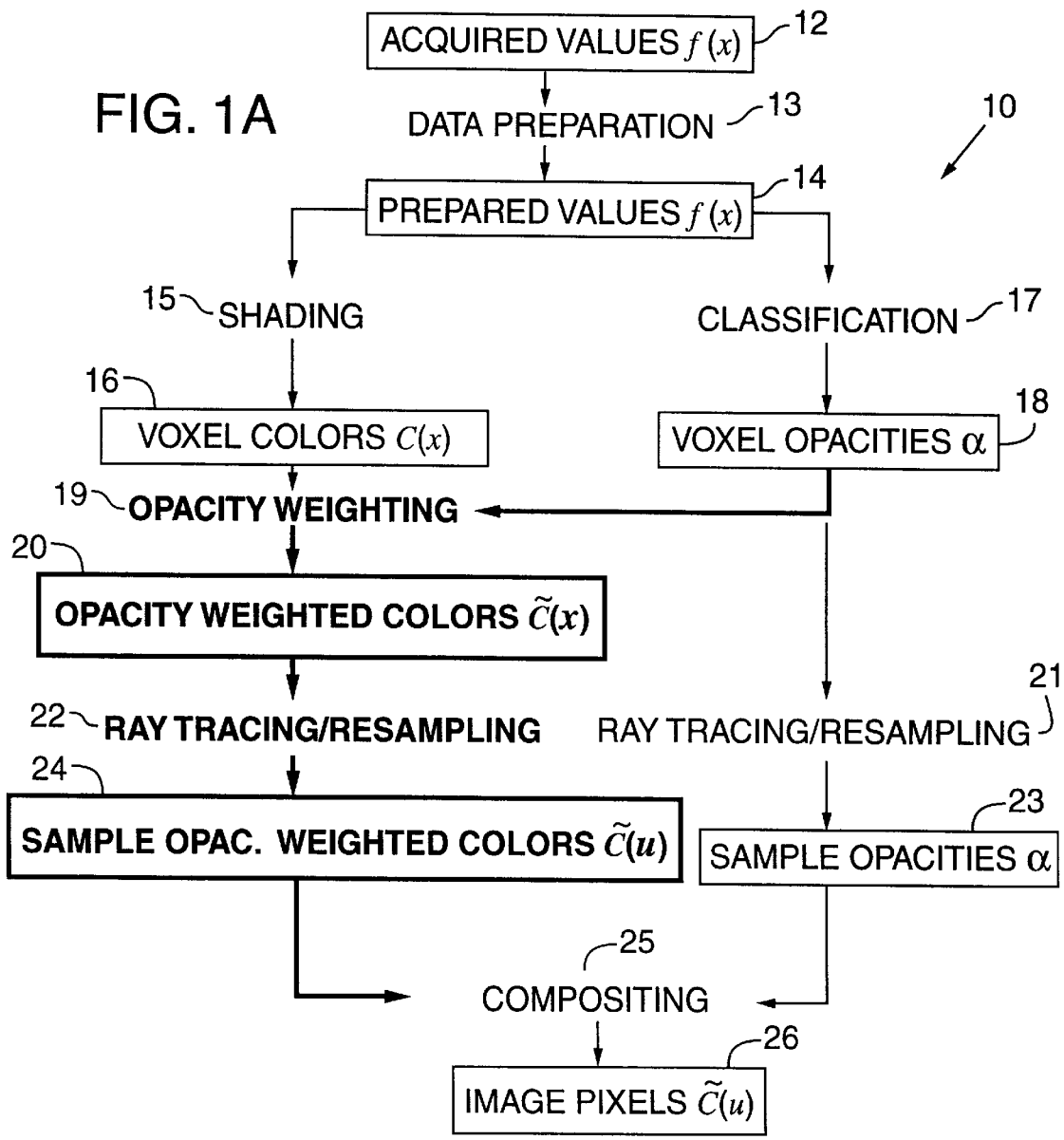

OPACITY-WEIGHTED COLOR INTERPOLATION FOR VOLUME SAMPLING

BACKGROUND OF THE INVENTION

The present invention relates to computer image generation and more particularly to methods for generating two-dimensional displays of an image based on three-dimensional image data.

Many imaging systems produce data representing physical entities or properties in three-dimensional space. Examples include CAT scans, MRI scans, ultrasound images and seismic test images. The process of converting the three-dimensional arrays of data into two dimensional image displays is referred to as volume-rendering. The term voxel processing is also used, because the 3-D space is ordinarily broken down into small volumes, referred to as voxels. Each voxel has optical properties, ordinarily expressed in terms of opacity (or its inverse, transparency) and color (or grey-scale in black and white imaging systems). These properties contribute to the overall image when it is to be computed by mathematical projection and sampling and converted into pixels to be displayed on a two dimensional display surface.

Volume rendering employs a class of algorithms for visualizing or representing three-dimensional grids of data. Such algorithms are based on the physics of light interaction with modeled particles in a volume. The beginnings of a particle model for graphics rendering were developed by Blinn (Bli82) and extended by Kajiya et al. (KH84) to nonhomogeneous densities of particles. The common algebraic technique for combining ray samples is compositing, derived separately by Blinn (Bli82) and Porter et al. (PD84). Modem direct volume rendering algorithms are largely based on Levoy (Lev88), Drebin et al. (DCHB88), Sabella (Sab88), and Upson et al. (UK88). Up-to-date surveys may be found in Max (Max95) and Kaufman (Kau91).

Levoy in (Lev88) proposed a volume rendering pipeline that classifies and shades voxels before interpolation. This approach can lead to two computational advantages compared to classifying sample points interpolated from voxel data. First, classification can be treated as a preprocess and need not be repeated per view. Second, the number of voxels in a data set can be significantly less than the number of sample points when computing a view, resulting in lower classification cost. Commonly-assigned U.S. Pat. No. 5,557,711 discloses a multiprocessor and parallel method for volume rendering by preprocessing transparency and luminescence signals in subsets or regions of an object space and then compositing the signals from such regions for the object space as a whole. Unfortunately, classification first followed by interpolation as described in (Lev88, Lev89, Lev90) erroneously interpolates shaded color values independently from opacity.

The wide use of volume rendering software from the seminal Levoy references, and the inherent complexity of the underlying model, have meant that implementations of volume rendering can include shading artifacts due to improper classification, shading, and interpolation. Drebin et al. (DCH88) specify opacity weighting of the colors. Others have noted the difficulties associated with opacity and color, notably Wilhelms (WG91) and Blinn (Bli94), but not as it relates to resampling of shaded color values in volume ray tracing. Wilhelms notes that different answers will result if one interpolates colors versus data, but the former may be faster. Blinn discusses the issues in filtering an image that has opacities at each pixel. He shows an example of overlaying and downsampling, and the different answer that results if downsampling is done first without opacity weighting the colors. He calls the opacity weighted colors "associated colors." Wilhelms, Van Gelder et al. (Wil91,VGK96) discuss the issues in interpolating colors instead of materials, and resulting artifacts, but do not clarify that additional artifacts result if opacity weighted colors are not properly interpolated.

Accordingly, a need remains for a better way to process voxel data to interpolate color values in proper relation to opacity values, so as to avoid introducing artifacts.

SUMMARY OF THE INVENTION

In order to solve the need for an accurate two-dimensional representation of a three-dimensional image, the invention provides an improved method and apparatus for processing voxel data which avoids the problem of color artifacts coming from zero opacity regions.

Particularly, according to the invention, a computer system has a processing subsystem, a memory and a display for displaying an image in a two-dimensional array of pixels. The three-dimensional image is stored in the computer memory as a three-dimensional data array comprising object data values associated with a plurality of sample points in a three-dimensional space. A method for generating a pixel color value to be displayed in a subset of the array of pixels as a part of the two-dimensional representation comprises the steps of, first, processing the object data values to determine voxel colors C and voxel opacities $\alpha$ for the plurality of sample points. Second, the voxel colors are opacity weighted to produce a set of opacity weighted colors $\tilde{c}$. Third, the voxel opacities $\alpha$ and the opacity weighted colors $\tilde{c}$ from each sample point are composited to form the two-dimensional view. In this manner, artifacts resulting from zero opacity areas contributing to the overall color are eliminated because of the opacity weighting performed prior to compositing.

An apparatus for mathematically calculating and visually displaying a two-dimensional view of a three-dimensional image is also provided. In this apparatus, a two-dimensional array of pixels for representing the three-dimensional image is created by generating a pixel color value to be displayed in a subset of the array of pixels. The apparatus comprises a memory for storing the three-dimensional image as a three-dimensional data array comprising object data values associated with a plurality of sample points in a three-dimensional space. A central processing unit (CPU) is provided for processing the object data values to determine voxel colors C and voxel opacities a for the plurality of sample points. The processing unit must also be capable of mathematically calculating a set of opacity weighted colors $\tilde{c}$ by opacity weighting the voxel colors. A compositor composites the voxel opacities $\alpha$ and the opacity weighted colors $\tilde{c}$ from each sample point to form the two-dimensional view, and a display unit visually displays the two-dimensional view.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1A is a flowchart of a volume rendering pipeline analogous to a prior art system but using opacity weighted colors for interpolation implemented by modified and added steps shown in bold lines.

FIG. 2A showing the result with independent interpolation of color and opacity, as is commonly done in the prior art, and FIG. 2B showing the correct results with opacity weighted interpolation.

DETAILED DESCRIPTION

Figure 1B:
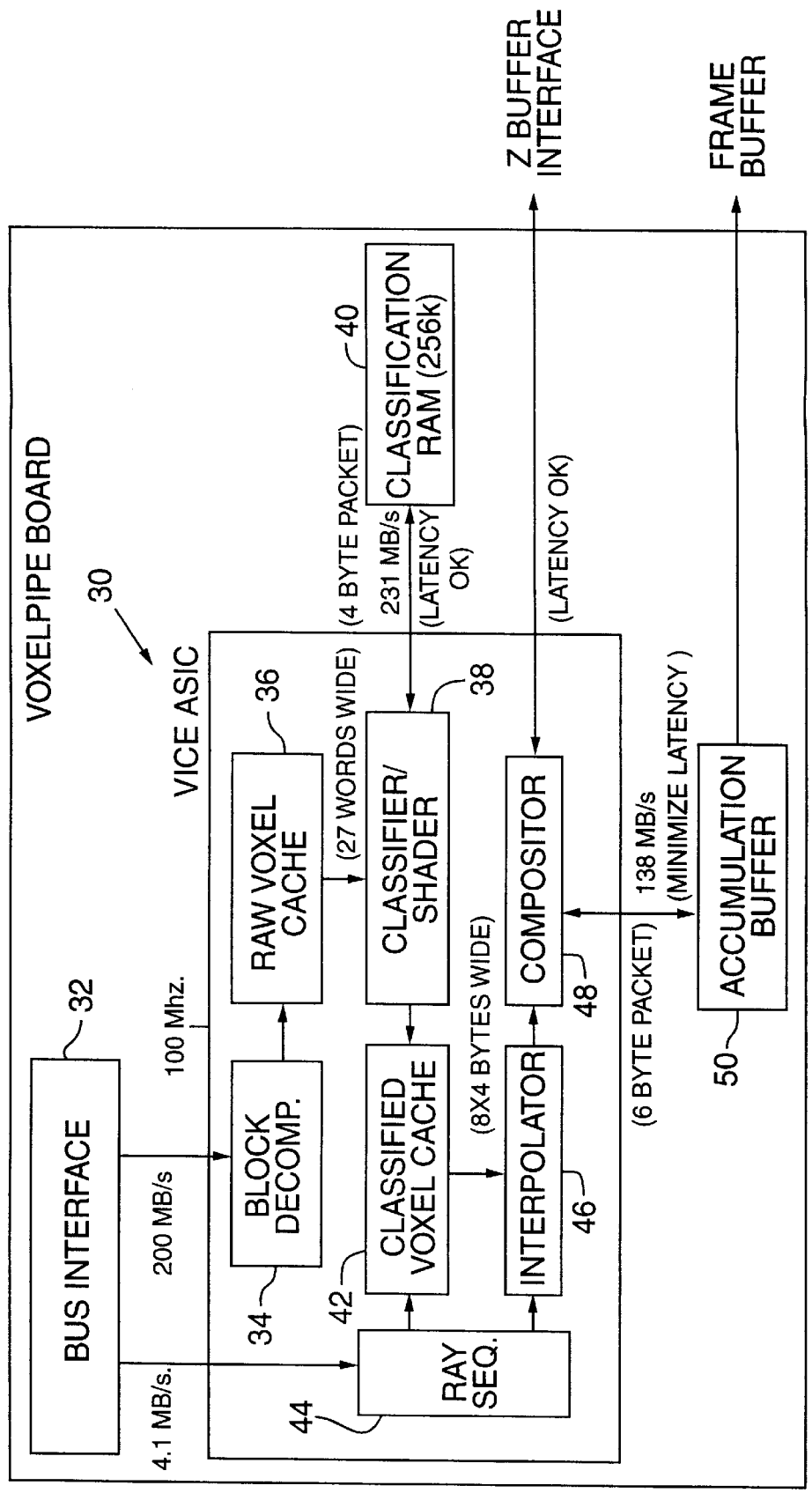
FIG. 1B is a block diagram of a voxel processing subsystem for implementing the present invention.

I. Volume Rendering Pipeline with Opacity Weighted Colors

FIG. 1A shows a volume rendering pipeline 10 analogous to the prior art system described by Levoy (Lev88) but with modified and added blocks (shown in bold) to implement opacity weighting of colors according to the present invention. Opacity weighting must occur prior to interpolation for the ray resampling, and hence cannot be corrected for in the compositing stage following interpolation. The volume rendering pipeline 10 is arranged to avoid this difficulty, as well as the problem further outlined below.

The volume rendering pipeline 10 begins, as in the prior art, with a set 12 of acquired values f(x) for an object space, and the data is processed in a data preparation step 13 to produce a set 14 of prepared values f(x). The prepared values are then split by shading and classification steps 15, 17 into a set 16 of voxel colors C(x) and a set 18 of opacities $\alpha$. In the prior art, these values would be processed separately through the two processing branches before being combined in a final compositing step. According to the invention, however, the voxel opacities are fed back to the color processing branch to be used in an opacity weighting step 19, to produce a set 20 of opacity weighted colors $\tilde{c}$ (x). Then, while a conventional ray-tracing step 21 proceeds on the opacity branch of the pipeline to produce a set 23 of sample opacities $\alpha$, a ray tracing/resampling step 22 proceeds on the color branch, using the opacity weighted colors $\tilde{c}$ (x). This step produces a set 24 of sample opacity weighted colors $\tilde{c}$ (u). A final compositing step 25 composites the sample opacities $\alpha$ and sample opacity weighted colors $\tilde{c}$ (u) to produce a set 26 of image pixels.

Figure 5:
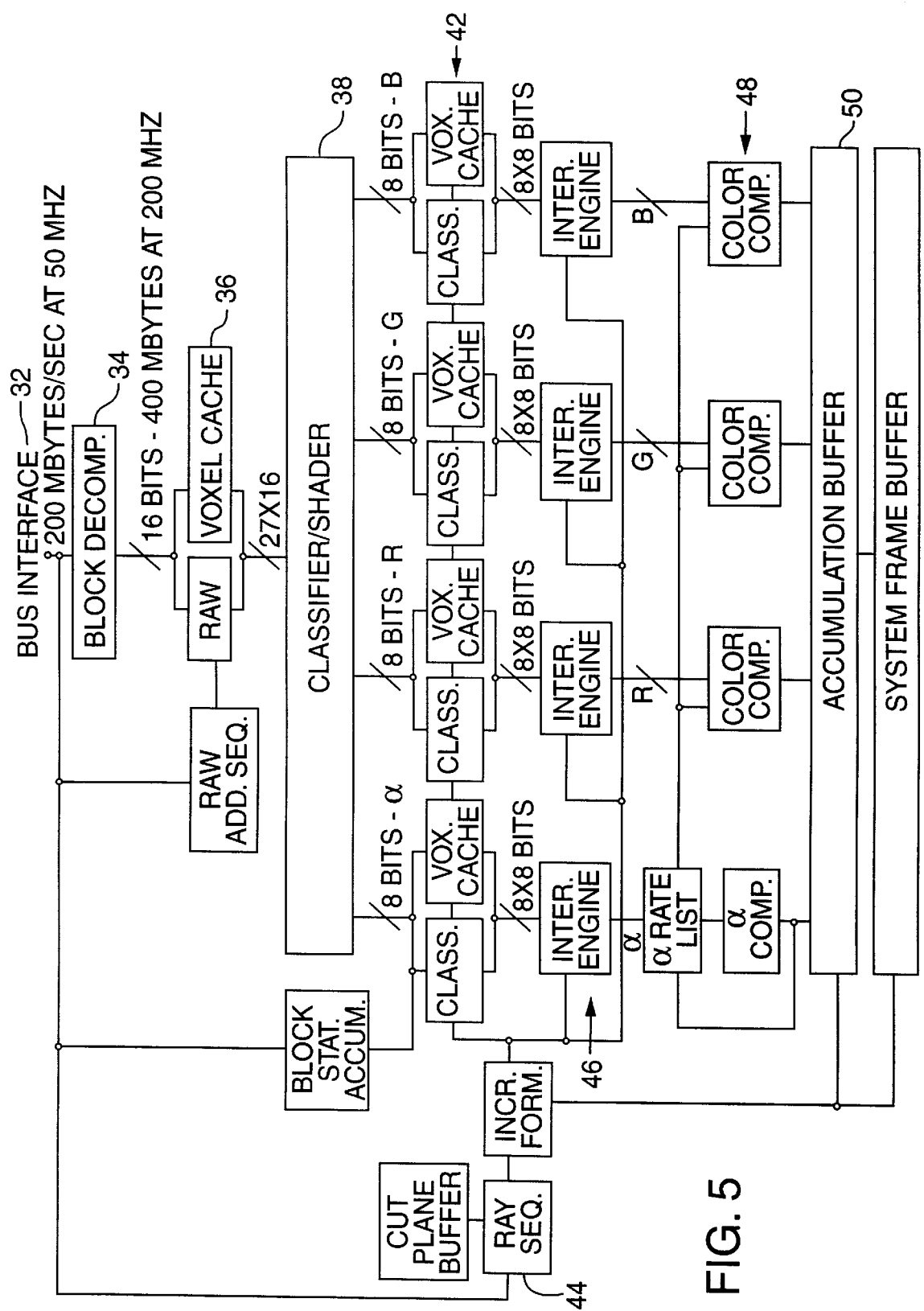
FIG. 5 is block diagram of voxel processing subsystem similar to FIG. 1B, like numerals representing similar elements, showing an example of an architecture which can be used to implement the opacity weighting method of the present invention in a full color system.

FIG. 1B shows an architecture of a voxel processing circuit 30 in which the foregoing pipeline can be implemented. The circuit 30 is designed to be used in a conventional workstation or personal computer, plugged into the main bus to communicate with the computer's central processing unit (CPU), random access and disk memories, and display subsystem and monitor. Accordingly, the circuit 30 has a bus interface 32 which communicates to the computer's main bus to receive voxel block data (object space address, opacity and unweighted color data for each sample point in object space, which can be in a compressed format) and ray data (vectors defining rays through the object space). The voxel block data is received by a decompression engine 34, decompressed, and then forwarded to a raw voxel cache or memory 36. The voxel data is then passed to a classifier/shader 38 which, using a classification RAM 40 as a scratch memory, processes the raw voxel data for each sample point into an opacity $\alpha$ and a color value C, which is a single quantity in a black/white/grey-scale system, or three values ($C_r$, $C_g$, $C_b$) in a full color system (see FIG. 5). The classified voxel data are stored in a classified voxel cache 42 which includes a cache for the opacity data and, for a full color system, three caches for the three sets of color data (see FIG. 5). These data are then held pending selection of a view of the data by the user of the computer system.

Viewing software running on the CPU generates rays defining a direction for viewing through the object space responsive to a user inputting a selected viewing direction. These rays are transmitted via the bus interface 32 to a ray sequencer 44 which controls operation of an interpolator 46. The interpolator 46 comprises an interpolation engine for processing the opacity data ($\alpha$) and, for a full color system, three interpolation engines for processing the three sets of color data ($C_r$, $C_g$, $C_b$) (see FIG. 5). Each interpolation engine operates to resample the voxel data along the rays, interpolating between the sample points as needed to determine the most likely opacity and color values at each sample point along the rays. Associated with each interpolation engine is a compositor 48 which composites the resampled data along the rays, preferably in a back-to-front manner. The compositors produce a set of pixel data defining a two-dimensional view of the object space as seen along the rays. This pixel data is stored in an accumulation buffer 50 for output to the frame buffer of the computer display subsystem.

Section II discusses the root of the problem and Section III describes the present invention in further detail. Sections IV and V show comparison results and conclusions. We demonstrate the problem encountered by separate interpolation of color and opacity in the context of ray cast volume rendering. The suitability of the interpolation method presented is not limited to ray-casting, however, and applies to other techniques such as splatting (Wes90) and three-dimensional texture mapping (VGK96) as well.

II. Problem Example

We follow Blinrn's (Bli94) notation for an opacity-weighted color, which he calls an associated color, and denotes as $\tilde{c}=\alpha C$, where C is simply the nonweighted color. The compositing equations for back-to-front compositing are:

$$\tilde{c}_{new}=(1-\alpha_{front})\tilde{c}_{back}+\tilde{c}_{front} \qquad (1)$$

$$\alpha_{new}=(1-\alpha_{front})\alpha_{back}+\alpha_{front} \qquad (2)$$

If we were to use nonweighted colors, the corresponding equation would be (opacity is calculated the same as eq. 2):

$$\tilde{c}_{new}=(1-\alpha_{front})C_{back}\alpha_{back}+C_{front}\alpha_{front} \qquad (3)$$

Figure 2B:
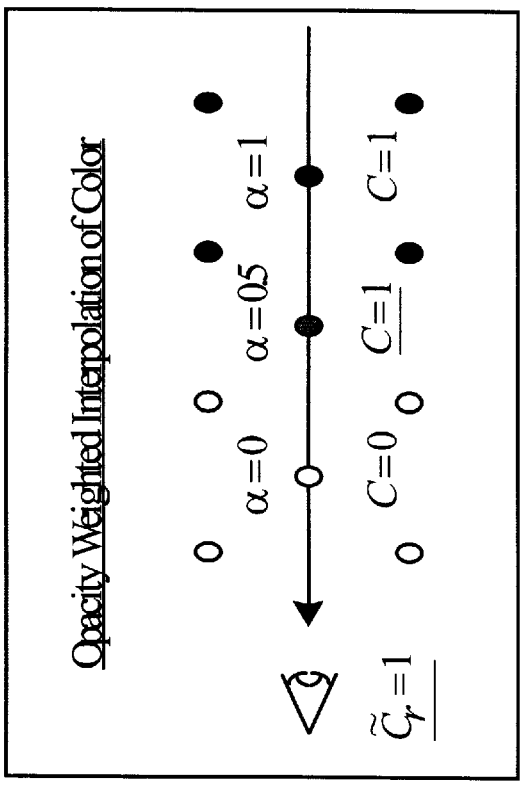
FIGS. 2A and 2B are ray trace diagrams of a ray leaving a fully opaque material into empty space showing sample points and compositing results, differing values underlined for clarity.
Figure 2A:
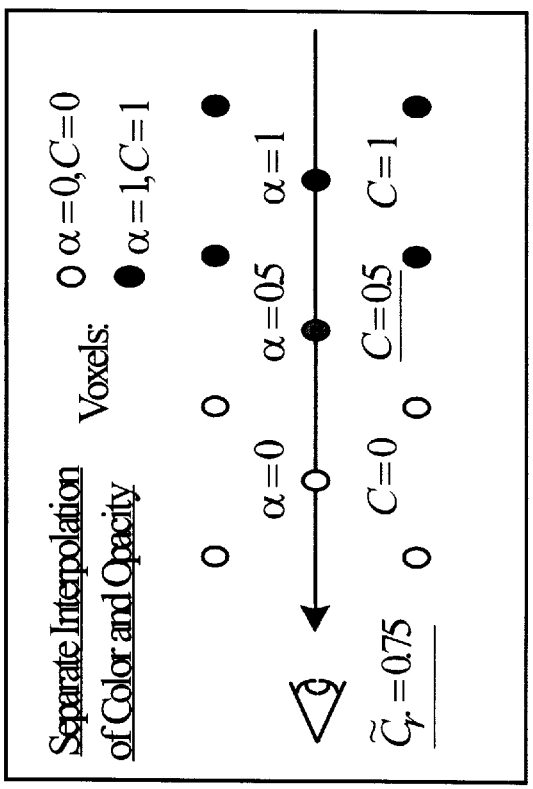

To illustrate the difficulties encountered in performing separate interpolation of opacity and color values, compare FIGS. 2A and 2B, showing sample points and compositing results for the prior art and the present invention in the case of a ray leaving a fully opaque material into empty space.

FIG. 2A shows the result with independent interpolation of color, and opacity, as is conventionally done. This approach incorrectly allows colors associated with an empty region of space to contribute to the ray, thereby resulting in unwanted artifacts. FIG. 2B shows the correct results using opacity weighted interpolation. Differing values are underlined for clarity.

First, consider FIG. 2A, which assumes the back-to-front compositing formula given as in equation 3. In FIG. 2A, the ray is shown exiting a fully opaque region, into a region of empty space. Voxels are classified and shaded before interpolation. The difficulty arises in the middle sample point which is positioned between opaque and transparent samples. The conventional method yields a color value of C=0.5 since it averages the material and empty space colors. Since the opacity value is 0.5, this sample does contribute color to the ray. However, the color that it contributes is incorrect since it has been partially affected (50%) by the color that the empty space takes on. The color assignment to regions with zero opacity should not contribute to the final image. This artifact arises because the interpolation that is conventionally used is not a material-based interpolation. The resultant ray color (or grey-scale value) $_c r$, as affected by zero opacity regions, is shown in the lower left hand corner of FIG. 2A.

FIG. 2B shows the interpolation of opacity weighted colors, as discussed further in the next section. Note that the resultant ray color is not affected by the color assignment in empty space. This interpolation method essentially treats opacity as a material density and weights the color contributions of each voxel by this density. From a particle model perspective (KH84), the greater number of particles from a high density material influences color more than a lower density material's contribution. The resultant ray capacity $_c r$, unaffected by the zero opacity regions, is shown in the lower left hand corner.

III. Opacity Weighted Interpolation of Colors

Proper calculation of resampled colors is done by weighting each source voxel color value, ($C_r$, $C_g$, $C_b$) by the opacity α. These weighted colors are then interpolated, as are the opacity values. A ray sample opacity and color are calculated using a weighting factor w as:

$$\alpha = \sum_i w_i \alpha_i \quad (4)$$

$$\tilde{C} = \sum_i w_i \alpha_i C_i = \sum_i w_i \tilde{c}_i \quad (5)$$

The compositing is then performed as above (equations 1, 2), using these opacity weighted colors at each sample point. At each source voxel, we choose to store opacity α and unweighted color C, and perform the opacity weighting during interpolation. For the case where α is 0, the products with ($C_r$, $C_g$, $C_b$) are zero, therefore, the colors can be set to 0. Since the products $w_i \alpha_i$ are used for each channel, they can be computed once as $\omega_i = w_i \alpha_i$, resulting in:

$$\alpha = \sum_i \omega_i \quad (6)$$

$$\tilde{C} = \sum_i \omega_i C_i \quad (7)$$

This new method uses efficient calculation, with minimal storage requirements, and computes correct ray colors. In fact, compared to separate interpolation of color and opacity, the new method involves one less multiplication per sample point along a ray, per color channel, due to the simpler compositing equation (1) versus (3).

There are three alternative approaches to avoiding the interpolation artifacts described in Section II. These approaches are summarized and compared in the following table, Table 1.

TABLE 1

Volume rendering approaches that avoid interpolation artifact.
Volume Rendering Approaches

| Method | Advantages | Disadvantages |
| --- | --- | --- |
| (1) Interpolate then classify | Sharper surface detail as compared to (2), (3) | Classification: *view dependent *needed per view |
| (2) Store opacity weighted colors | Shorter render time compared to (1) | Requires more bits/voxel than (3) |
| (3) Store Unweighted Colors, α weighted interpolation | Short render time less bits/voxel | Softer imagery compared to (1) |

The first alternative is to store raw data values themselves, interpolate these down to ray samples, and then classify the interpolated results. This is sometimes referred to as post classification. Opacity weighting problems are avoided by this approach. In addition, image quality is often superior since sub-voxel surfaces are reconstructed by this approach. There are, however, certain drawbacks. First, classification must be performed for every frame being computed, unlike the preclassification case where classification is only performed when the classification function changes. Computational cost is also typically higher since there are often more ray sample points than voxels involved in a rendering. Second, since classification acts on sample points whose positions are view dependent, the classification is itself view dependent. This approach can introduce view-dependent artifacts.

The second alternative is to store classified-shaded-color values preweighted by opacity, along with opacity at each voxel, as was done in Drebin et al. (DCH88). Interpolation is then performed on preweighted colors. Preweighted colors, however, require more bits of precision than unweighted colors for the same image quality. This is because opacity weighting returns a fraction of the shaded values, which in fixed point will reduce the accuracy of subsequent calculations. In the proposed alternative a higher precision representation can be used during weighting which results in greater accuracy.

The third alternative is opacity weighted color interpolation as described herein. Color and opacity values are stored independently. Opacity weighting is performed during interpolation for memory savings (bit precision), computational advantages of preclassification, and comparable speed to preweighting colors. Through examination of source code and inquiry we have determined that Lacroute et al. (LL94) perform weighting when loading scanlines for a similar solution. Three-dimensional texture mapping using hardware acceleration (VGK96) does not opacity weight colors, although it could be done by preweighting. Unfortunately, that may result in difficulties due to the fixed point texture storage formats. The next section demonstrates the artifacts incurred by interpolation of unweighted colors.

IV. Comparative Results

As illustrated in FIG. 2A, the interpolation of unweighted colors miscalculates the shading of new sample points along the rays. In volume rendering, such errors can result in color shifting, darkening, greater aliasing, and contribution of color from null regions. We show two examples of artifacts resulting from this error.

Figure 3A:
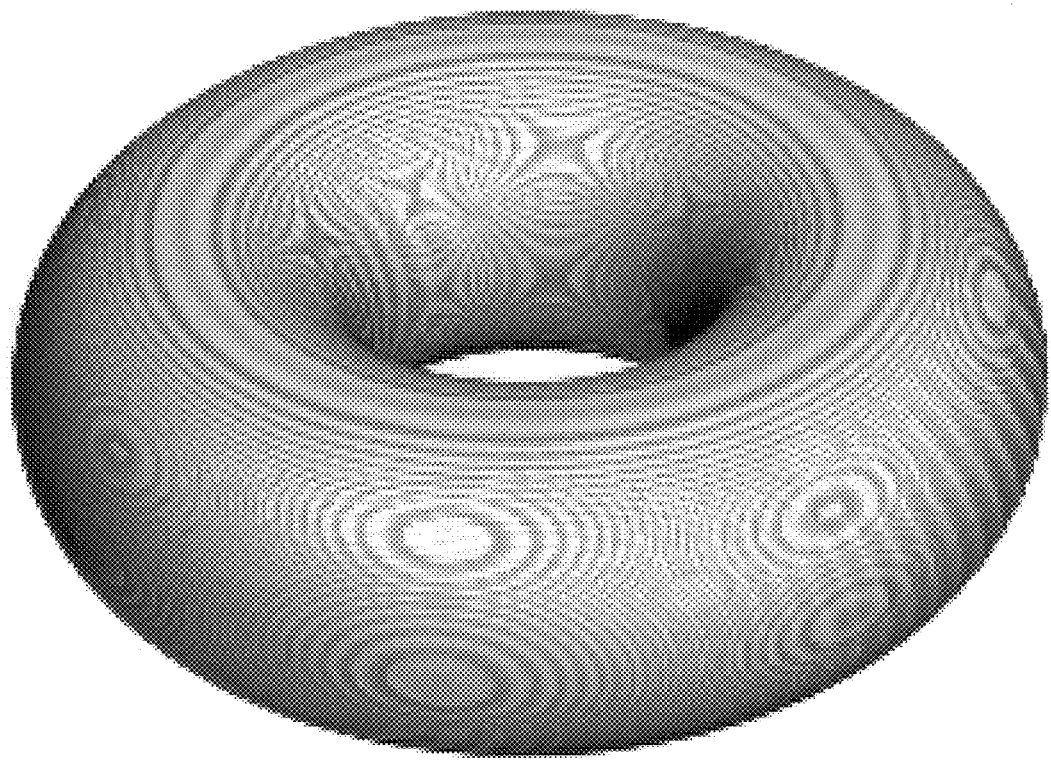
FIGS. 3A and 3B are black/white/grey-scale renderings of a torus, the view in FIG. 3A including artifacts of separate interpolation of colors according to the prior art and the view of FIG. 3B showing the improved image resulting from using opacity-weighted color interpolation according to the invention.
Figure 3B:
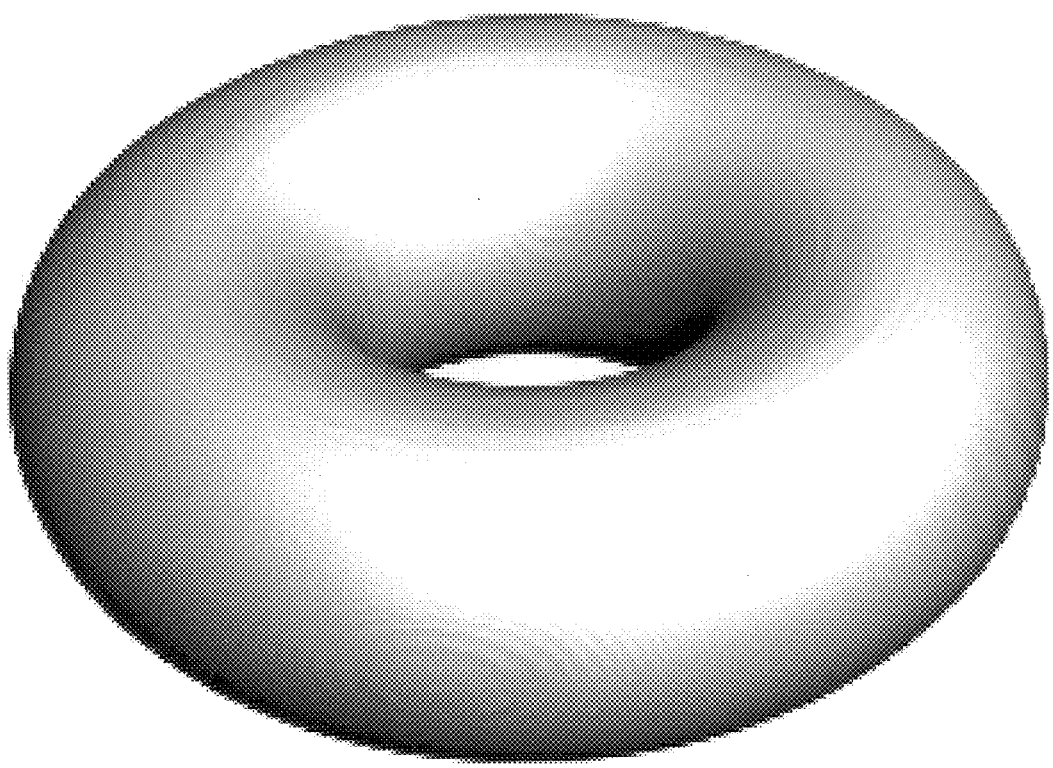

FIGS. 3A and 3B show two volume renderings of a volumetric torus. The data set is a sampled analytic torus function that has been low-pass filtered to 8 bit voxels for antialiasing. In this example, color consists of grey-scale shading. This volume is then classified before rendering using a standard isosurface classifier (Lev89). The rendering process itself uses a step size of one-half of the voxel spacing. The rendering of FIG. 3A, using separate interpolation of colors and opacity, causes severe banding artifacts since the colors assigned to empty space contribute to the ray with this scheme. The rendering using opacity weighted color interpolation, FIG. 3B, does not show these artifacts. Although voxelization of the torus is still somewhat apparent, this is due to the limited voxel resolution (256× 256×128) as opposed to any interpolation artifacts.

Figure 4A:
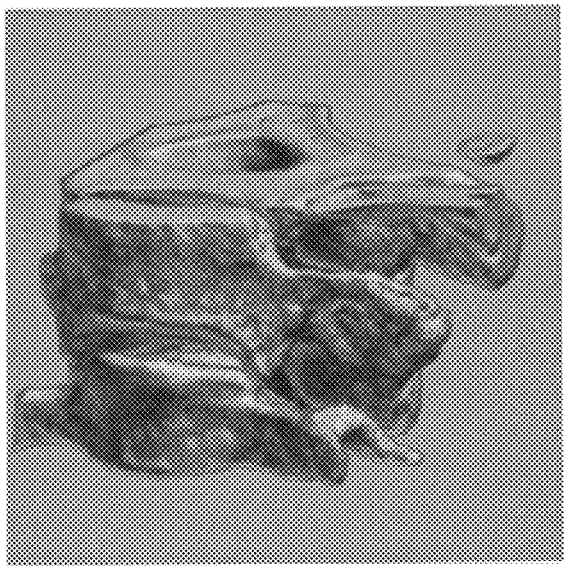
FIGS. 4A, 4B and 4C are black/white/grey-scale reproductions of color renderings of sections of human vertebrae collected via spiral CT and rendered using raycasting with preclassification.
Figure 4B:
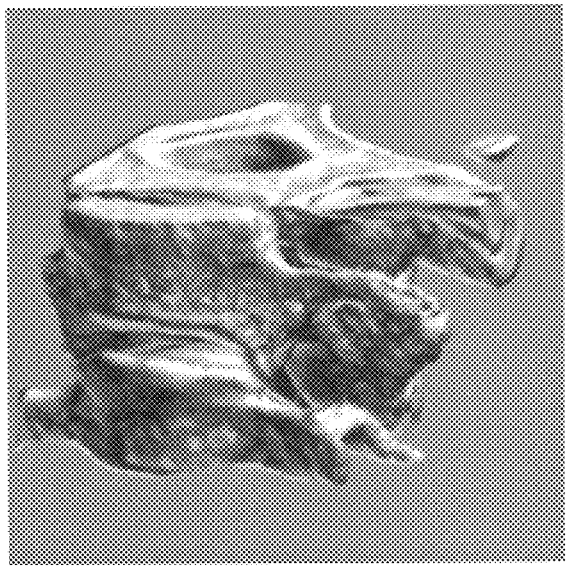
Figure 4C:
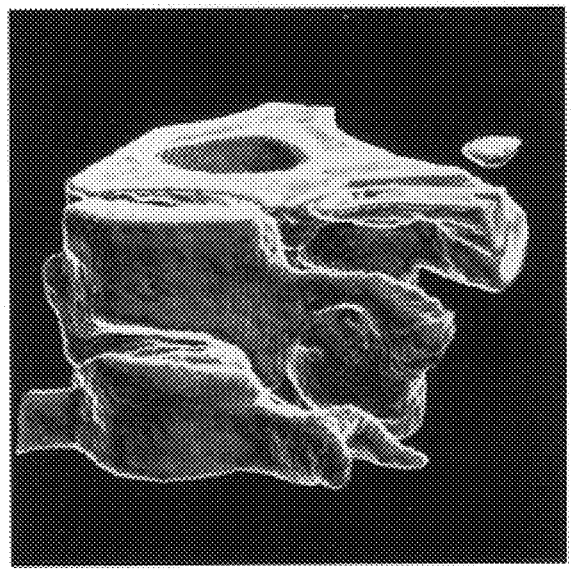

The second example, shown in FIGS. 4A, 4B and 4C, compares interpolation strategies on a rendering of a computed tomography data set. This 8 bit data set (100×96×249 voxels) includes several human vertebrae and was collected with spiral CT (data is courtesy of Dr. Ramani Pichumani, Stanford University). Classification was also performed as a preprocess. Empty space (opacity=0.0) surrounding the thresholded vertebrae was colored red. This coloring readily labels surface regions where inappropriate colors are being introduced. The data was rendered using volumetric raycasting with a step size of one half of the voxel spacing.

FIG. 4A shows the results of separate interpolation of color and opacity using the prior art method. In the color original, this image has a pinkish cast (shown as a grey tone in FIG. 4A compared to FIG. 4B) imparted erroneously by the prior art method from the transparent surrounding space, which was colored red to demonstrate the anomalous behavior of the prior art method. FIG. 4B shows opacity weighted interpolation of colors according to the present invention, using the same data set as for FIG. 4A, including the red coloration in the transparent space surrounding the vertebra. FIG. 4C shows a normalized difference image between FIGS. 4A and 4B. This view shows the extent of image data erroneously imparted into FIG. 4A from the transparent but red colored surrounding space. Note that the worst artifacts appear (red or grey areas in the image of FIG. 4A) when rays are able to graze along the surface for some distance, leading to a result that is dependent on surface orientation relative to the viewer. Animation also shows that the artifact causes banding and is view dependent.

V. Conclusions

The foregoing comparisons show what appears to be a common artifact in volume rendering software and algorithms. The origins of the artifact arise from an interpolation method that has been widely described in the literature and used, but not previously recognized to be improper. This artifact occurs when classifying and shading before resampling, and the present invention provides a solution for this case: opacity weighted color interpolation. Prior solutions have either interpolated ray values, and then classified and shaded, or stored entire opacity weighted volumes, which requires more storage precision. We have found that the error magnitudes are dependent on data set, view, classification, and shading, which may account for the oversight. Also, because of the number of steps in volume rendering, other artifacts may dominate, such as reconstruction error, gradient calculation, and shading, thereby reducing the perceived importance of opacity weighting. While the effects of misuse of opacity and color in volume rendering can be subtle, this invention clarifies an important nuance in a widely used algorithm, and will improve the quality and understanding of future implementations.

Having described the principles of the invention in a preferred embodiment thereof, it should be apparent that the invention can be modified in arrangement and detail without departing from such principles. We therefore claim all modifications and variations coming within the spirit and scope of the following claims.

VI. References (Bli82) J. Blinn, Light reflection functions for simulations of clouds and dusty surfaces. In Proc. of SIGGRAPH, pages 21–29, July 1982.

(Bli89) J. Blinn, Return of the Jaggy. IEEE Computer Graphics and Applications, pages 82–89, March 1989.

(Bli94) J. Blinn, Compositing, part I: Theory. IEEE Computer Graphics and Applications, pages 83–87, September 1994.

(DCH88) R. A. Drebin, L. Carpenter, and P. Hanrahan, Volume Rendering In Proc. of SIGGRAPH, pages 65–74, August 1988.

(Kau91) A. Kaufman, editor, Volume Visualization. IEEE Computer Society Press, Los Alamitos, Calif., 1991.

(KH84) J. T. Kajiya and B. Von Herzen, Ray tracing volume densities, In Proc. of SIGGRAPH, pages 165–174, July 1984.

(Lev88) M. Levoy, Display of surfaces from volume data, IEEE Computer Graphics and Applications, 8(5):29–37, May 1988.

(Lev89) M. Levoy. Display of Surfaces From Volume Data. Ph.D. thesis, University of North Carolina at Chapel Hill, 1989.

(Lev90) M. Levoy, Efficient ray tracing of volume data, ACM Transactions on Graphics, 9(3):245–261, July 1990.

(LL94) P. Lacroute and M. Levoy, Fast volume rendering using a shear-warp factorization of the viewing transformation, In Proc. of SIGGRAPH, pages 451–458, Orlando, Fla., July 1994.

(Max95) N. Max, Optical models for direct volume rendering, IEEE Transactions on Visualization and Computer Graphics, 1(2):99–108, June 1995.

(PD84) T. Porter and T. Duff., Compositing digital images, In Proc. of SIGGRAPH, pages 253–259, August 1984.

(Sab88) P. Sabella, A rendering algorithm for visualizing 3d scalar fields, In Proc. of SIGGRAPH, pages 51–58, August 1988.

(UK88) C. Upson and M. Keeler, V-buffer: Visible volume rendering, In Proc. of SIGGRAPH, volume 22, pages 59–64, July 1988.

(VGK96) A. Van Gelder and K. Kim, Direct volume rendering with shading via 3D textures, In Symposium on Volume Visualization, San Francisco, Calif., Oct. 1996.

(Wes90) L. Westover: Footprint Evaluation for Volume Rendering, in Proc. of SIGGRAPH, volume 24, no. 4, pages 367–376, July 1990.

(WG91) J. Wilhelms and A. Van Gelder, A coherent projection approach for direct volume rendering, In Proc. of SIGGRAPH, pages 275–284, 1991.

(Wil91) J. Wilhelms, Decisions in Volume Rendering, In SIGGRAPH 91 Course Notes 8-State of the Art in Volume Visualization, pages I.1–I.11, 1991.

We claim:

1. In a computer system having a processing subsystem, a memory and a display for displaying an image in a two-dimensional array of pixels, a method for generating an array of pixel color values to be displayed on the display as a two-dimensional view of a three-dimensional image, the three-dimensional image being stored in the computer memory as a three-dimensional data array comprising object data values associated with a plurality of sample points in a three-dimensional space, the method comprising:

processing the object data values, to determine voxel colors C and voxel opacities α for the plurality of sample points in the three-dimensional space;

opacity weighting the voxel colors C, to produce a set of opacity-weighted colors $\tilde{C}$ for the plurality of sample points in the three-dimensional space;

interpolating the voxel opacities α and the opacity-weighted colors $\tilde{C}$ between the sample points in the three-dimensional space, to determine the most likely opacity and color value at each sample point along a plurality of rays; and compositing the voxel opacities α and the opacity-weighted colors $\tilde{C}$ from each sample point along the plurality of rays, to form the two-dimensional view for displaying on the display.

2. A method according to claim 1 in which a ray sample opacity α and opacity weighted color $\tilde{c}$ are calculated using a weighting factor w as:

$$\alpha = \sum_i w_i \alpha_i \quad \text{and}$$

$$\tilde{C} = \sum_i w_i \alpha_i C_i = \sum_i w_i \tilde{c}_i.$$

3. A method according to claim 1 in which the compositing step includes back-to-front compositing according to the following equations:

$$\tilde{c}_{new} = (1-\alpha_{front})\tilde{c}_{back} + \tilde{c}_{front} \text{ and}$$

$$\alpha_{new} = (1-\alpha_{front})\alpha_{back} + \alpha_{front}.$$

4. A method according to claim 1 including:

storing an opacity value $\alpha_i$ and an unweighted color value $C_i$, at each sample point in the space;

interpolating values from the stored sample points to determine display image contributions from locations in the space between sample points; and performing the opacity weighting step during interpolation.

5. A method according to claim 1 in which the opacity weighting step is performed prior to compositing.

6. A method according to claim 1 in which, for the case where opacity α is 0 at any sample point, the color $\tilde{c}$ is set to 0 for that sample point.

7. A method according to claim 1 in which an unweighted color value $C_i$ at each sample point includes multiple channels ($C_r$, $C_g$, $C_b$) representing different colors, including calculating a ray sample opacity α and opacity weighted color $\tilde{c}$ according to the equations:

$$\alpha = \sum_i \omega_i \quad \text{and}$$

$$\tilde{C} = \sum_i \omega_i C_i,$$

where the product ω of a weighting factor w and the ray sample opacity α, according to the equation; $\omega_i = w_i \alpha_i$, is used for each channel.

8. An apparatus for processing and visually displaying a two-dimensional view of a three-dimensional image in a two-dimensional array of pixels, by generating a pixel color value for each pixel in the two-dimensional array of pixels to be displayed, the apparatus comprising:

a memory for storing the three-dimensional image as a three-dimensional data array comprising object data values associated with a plurality of sample points in a three-dimensional space;

a processing unit for processing the object data values to determine a voxel color C and a voxel opacity α for each of the plurality of sample points along a plurality of rays;

the processing unit including a means for opacity weighting the voxel colors to produce an opacity-weighted color $\tilde{C}$ at each sample point along the plurality of rays;

an interpolator for interpolating the voxel opacities α and the opacity-weighted colors $\tilde{C}$, to determine the most likely opacity and color value at each sample point along the plurality of rays;

a compositor for compositing the voxel opacities α and the opacity-weighted colors $\tilde{C}$ from the sample points along the plurality of rays to determine the pixel color value for each pixel of the two-dimensional array of pixels; and a means for visually displaying the two-dimensional view.

9. The apparatus according to claim 8, further comprising:

an interpolator comprising an opacity interpolation engine for processing the voxel opacities α, and a color interpolation engine for processing the voxel colors C, the interpolation engines operating to resample the voxel color C and the voxel opacity α at each of the sample points along the ray, interpolating between adjacent sample points to determine a most likely opacity and color at each sample point along the ray;

the compositor coupled to the opacity and color interpolation engines for compositing the resampled data in a back-to-front manner, the compositor producing the two-dimensional array of pixels defining the two-dimensional view.

10. The apparatus according to claim 8, further comprising:

a bus interface in communication with a main bus for communicating with the processing unit, the memory, and a display subsystem, and for receiving the object data values;

a decompression engine for receiving and decompressing the object data values and forwarding the object data values to a raw voxel memory; and a classifier/shader for accepting the object data values from the raw voxel memory, the classifier/shader having a classification memory for processing the object data values for each sample point along the ray into the voxel opacity α and the voxel color C.

11. An apparatus for processing a three-dimensional image by mathematical projection and sampling into a two-dimensional array of pixels to be displayed on a two-dimensional display surface, the apparatus comprising:

a voxel processing circuit having a bus interface in communication with a main bus for communicating with a central processing unit (CPU), random access and disk memories, and a display subsystem, and for receiving voxel data defining the three dimensional image from the main bus;

a decompression engine for receiving and decompressing the voxel data and for forwarding the voxel data to a raw voxel memory;

a classifier/shader for accepting the voxel data from the raw voxel memory, the classifier/shader having a classification scratch memory for processing the voxel data into a voxel opacity $\alpha$ and a voxel color C for each of a plurality of sample points;

a classified voxel cache including an opacity cache for storing the voxel opacities and a color cache for storing the voxel colors from the sample points pending selection of a direction for viewing the three-dimensional image by a user of the apparatus;

viewing software running on the CPU for generating a plurality of rays defining the direction for viewing the three-dimensional image responsive to the user selection;

means for opacity weighting the voxel colors C, to produce an opacity-weighted color $\tilde{C}$ at each sample point along the plurality of rays;

an interpolator comprising an opacity interpolation engine for processing the voxel opacities $\alpha$ and a color interpolation engine for processing the opacity-weighted voxel colors $\tilde{C}$, the opacity and color interpolation engines operating to resample the voxel data along each ray, interpolating between the sample points to determine most likely opacity and color value at each sample point along the rays;

a ray sequencer for controlling the interpolator;

a plurality of compositors, one compositor in communication with each of the opacity and color interpolation engines for compositing the resampled data along the rays, in a back-to-front manner, the compositors producing pixel data for generating the two-dimensional array of pixels defining a two-dimensional view of the three-dimensional image as seen along the rays; and an accumulation buffer for storing the pixel data and for outputting the pixel data to the display subsystem to display the two-dimensional view of the three-dimensional image on the two-dimensional display surface.

12. The apparatus according to claim 11, in which the voxel color C has a single quantity in a black/white/greyscale system.

13. The apparatus according to claim 11 for a full color system in which the voxel color C has three values ($C_r$, $C_g$, $C_b$), the interpolator comprises three color interpolation engines, one for each of the three values of the voxel color C, and the classified voxel cache has three caches for storing the three values of the voxel color C.

* * * * *